US006368649B1

(12) United States Patent
van Bommel

(10) Patent No.: US 6,368,649 B1
(45) Date of Patent: Apr. 9, 2002

(54) METHOD OF REMOVING THE FIBROUS SHELLS FROM CEREAL GRAINS

(75) Inventor: Bernhard George van Bommel, Kalmthout (BE)

(73) Assignee: Cargill B.V., Bergen Op Zoom (NL)

( * ) Notice: Subject to any disclaimer, the term of this patent is extended or adjusted under 35 U.S.C. 154(b) by 0 days.

(21) Appl. No.: 09/432,621

(22) Filed: Nov. 3, 1999

(30) Foreign Application Priority Data

Apr. 27, 1999 (NL) .......................................... 1011901

(51) Int. Cl.[7] .............................. B02B 3/12; A23L 1/10

(52) U.S. Cl. ......................... 426/482; 426/524; 99/518; 99/600; 99/517; 99/601; 99/623; 241/8; 241/DIG. 37

(58) Field of Search ................................ 426/482, 484, 426/524, 618, 629; 241/8, DIG. 37, 65, 12; 99/451, 539, 518, 525, 570, 572, 600, 601, 517, 623

(56) References Cited

U.S. PATENT DOCUMENTS

| | | | | |
|---|---|---|---|---|
| 1,826,247 | A | * | 10/1931 | Heppenstall |
| 2,085,051 | A | * | 6/1937 | Taylor |
| 2,234,157 | A | * | 3/1941 | Jones |
| 2,771,927 | A | * | 11/1956 | Thaning |
| 2,867,256 | A | * | 1/1959 | Earle |
| 3,126,932 | A | * | 3/1964 | Moran et al. |
| 3,222,183 | A | * | 12/1965 | Rozsa et al. |
| 3,399,838 | A | * | 9/1968 | Hanser |
| 3,452,936 | A | * | 7/1969 | Hanser |
| 3,474,722 | A | * | 10/1969 | Watson et al. |
| 3,630,754 | A | * | 12/1971 | Wayne |
| 3,632,051 | A | * | 1/1972 | Rado et al. |
| 3,744,399 | A | | 7/1973 | Bonteil ...................... 99/233.6 |
| 3,821,451 | A | * | 6/1974 | Palyi |
| 3,979,375 | A | * | 9/1976 | Rao et al. |
| 4,090,669 | A | * | 5/1978 | Lermuzeaux |
| 4,208,259 | A | * | 6/1980 | Oughton |
| 4,335,151 | A | | 6/1982 | Caubet ....................... 426/482 |
| 4,435,429 | A | | 3/1984 | Burrows et al. .............. 426/18 |
| 4,436,757 | A | * | 3/1984 | Lange et al. |
| 4,547,382 | A | * | 10/1985 | Gannon |
| 4,742,686 | A | * | 5/1988 | Cook |
| 5,049,428 | A | * | 9/1991 | Muralidhara et al. |
| 5,164,013 | A | * | 11/1992 | Posner et al. |
| 5,364,471 | A | * | 11/1994 | Czuchajowska et al. |
| 5,709,344 | A | | 1/1998 | Archer |
| 5,773,066 | A | * | 6/1998 | Satake et al. |
| 6,059,117 | A | * | 5/2000 | Novak et al. |

FOREIGN PATENT DOCUMENTS

| | | | |
|---|---|---|---|
| FR | 2032032 | * | 11/1970 |
| FR | 79 05315 | | 9/1980 |
| FR | 91 12461 | | 4/1992 |
| GB | 672229 | | 5/1952 |
| GB | 726138 | | 3/1955 |
| GB | 2 064 941 A | | 6/1981 |

OTHER PUBLICATIONS

Fennema, "Food Chemistry", third edition, p. 200, 1996.*

* cited by examiner

*Primary Examiner*—Cynthia L. Nessler
(74) *Attorney, Agent, or Firm*—Fiitch, Even, Tabin & Flannery

(57) ABSTRACT

The invention relates to a method of removing the fibrous shells from cereal grains. This method according to the invention comprises a pretreatment step, wherein the moisture content of the cereal grains is increased, e.g. in the case of corn grains from 16 to more than 20% by weight, followed by the step of exposure of the pretreated grains to a thermal shock by means of a cryogenic medium and thereafter mechanical treatment step thereof.

19 Claims, 1 Drawing Sheet

METHOD OF REMOVING THE FIBROUS SHELLS FROM CEREAL GRAINS

FIELD OF THE INVENTION

Firstly, this invention relates to a method of removing fibrous shells from cereal grains, the method comprising a step of exposure of the cereal grains to a thermal shock by a cryogenic medium and a step of mechanical treatment thereof.

DESCRIPTION OF THE PRIOR ART

A method of this kind is known from Belgian patent 902 584, for example. In this known method of separating the exterior shell layer or layers from the remaining portion of legumes and cereals, the agricultural products to be treated are cooled or frozen, preferably using liquid nitrogen, whereafter they are subjected to a mechanical treatment in order to separate the exterior layer or layers from the remaining portion. Bilobated legumes fall further apart into their two lobes by these treatment steps.

Furthermore a similar cooling step using for example liquid nitrogen for separating the shells from cereal grains is known from DE-A-2 938 635, by which it is intended that only the decorticated grains are exposed to a milling treatment after separation and that the inert (nitrogen) gas atmosphere reduces the risk of explosion.

FR-A-2 032 032 discloses a method of removing the shells from seeds, in particular oil-containing seeds, like mustard seeds, wherein this removal is carried out at a low temperature, where the fats are in a solid (solidified) state. An improvement of this prior art method is known from U.S Pat. No. 4,090,669, wherein the seeds are subjected to a thermal shock in a fluid bed, preferably using a cryogenic medium.

U.S. Pat. No. 4,436,757 discloses a method of removing the shells of sunflower seeds (decorticating) and the separation (hulling) thereof from the "meat", wherein the seeds are immersed in a bath of liquefied gas like liquid nitrogen for 1 to 6 minutes, and directly afterwards the seeds thus treated are contacted with a liquid or other aqueous heating medium having a temperature, which is at least 100° F. higher than the boiling point of the liquefied gas.

In general dry methods for removing the shells from cereals, legumes, seeds and the like are preferred to wet methods, which are applied conventionally, wherein large amounts of water are required, as explained hereinbelow.

In the cereals processing industry, e.g. in the processing of wheat, corn, soy and tapioca into fractions containing the different constituents of the cereals, traditionally the non-usable materials like foreign matter and broken grains are separated in a first step ("cleaning") by means of screening on a vibrating table, optionally using a forced flow of air and electromagnets in order to remove metal parts. In such a separation step the cleaned cereal grains to be processed further are separated from the non-usable fraction based upon differences in size and/or weight. A drawback thereof is the limited accuracy which can be achieved in such a separation. The cereal grains, from which the foreign matter has been removed, is used as starting material for further "wet" processing. Hereinbelow an example of the wet processing of corn into fractions of gluten and starch respectively is described in detail.

After screening of the foreign matter and broken grains from the corn, in the wet process this corn is mixed with a certain quantity of water (approximately 1,5 time the weight of corn), which if desired contains a small amount of sulphurdioxyde, and is steeped therein for a few days ("steeping") and subsequently milled into a slurry such that the germs are not damaged. The slurry thus obtained is passed over screen bendings and through hydrocyclones in order to remove the germs from the slurry. The germs separated are dewatered and dried. The slurry, from which the germs have been removed, is milled again and passed over screen bendings having smaller meshes in order to remove the fibres, which are predominantly derived from the shell of the corn kernels. The fibres are washed in countercurrent with water in order to limit the loss of starch and to recover the starch in this water. After this washing step the fibres are dewatered and dried with the aid of conventional techniques, and stored.

The slurry, which now consists primarily of granules of starch and gluten and water, is separated into a fraction of starch and a fraction of gluten. This separation is carried out in centrifuges and hydrocyclones, into which water is fed in countercurrent. The gluten fraction thus obtained is dewatered and dried and milled to the desired dimensions. The starch fraction is subjected to a refining treatment with acid and/or enzymes in order to obtain all sorts of compositions of glucose syrups. If desired, the starch can be modified into more specific derivatives thereof.

OBJECTS OF THE INVENTION

One of the serious disadvantages of these traditional "wet" methods of processing is the large volume of water, which is consumed and which has to be removed subsequently from the separated fractions such as the germs, fibres and gluten, by means of dewatering and drying, for which operations a large need for energy exists. Furthermore the process water, if it cannot be reused in other parts of the plant, has to be recognized as industrial waste water, which may not be discarded of as such via the sewer, so that high additional costs are involved in the disposal and processing of this kind of water.

Although the dry methods mentioned above using a cryogenic medium, wherein the shell is removed while the grains are deeply cooled, do not suffer from the disadvantages involved in the wet processing regarding drying and dewatering, respectively waste water, and from that point of view look very promising, these methods have not been used on an industrial scale as far as known in the processing of cereal grains into individual fractions of starch and gluten respectively. In this regard it has to be noted that in the cereal processing industry a distinction is made between on the one hand wet processes ("wet milling"), wherein the separation of the cereal grains into the different constituents thereof, such as starch, gluten, germs and the like is aimed for, which constituents are suitable for different end purposes, and on the other hand dry processes ("dry milling"), wherein such a separation into the different constituents is not intended, but instead thereof a flour is obtained, which is composed of all constituents of the cereal grains.

Firstly, the object of the present invention is to provide an improved method for the processing of cereal grains into starch and gluten, wherein the shells of the cereal grains are removed in an efficient manner at a relatively low need for water and energy.

A further object of the invention is to provide substeps, suitable in the processing of cereal grains into starch and gluten, wherein almost no water or no water at all is required.

SUMMARY OF THE INVENTION

The method of removing fibrous shells from cereal grains according to the invention comprises a step of exposure of the cereal grains to a thermal shock by a cryogenic medium and a step of mechanical treatment thereof, wherein the method also comprises a pretreatment step, wherein the cereal grains are subjected to a moistening treatment.

It has been found that when cereal grains, which normally contain a relatively low moisture content in the range of 10–18% after harvesting and at storage, are allowed to absorb water for a sufficient period of time, and the cereal grains thus moistened are exposed to a thermal shock by means of a cryogenic medium, then the shell very easily splits off from the remainder of the grain by and during the subsequent mechanical operation. When the pretreatment according to the invention is applied, furthermore it has appeared that the cereal grains do not need to be cooled deeply, with the result that the exposure time to the cryogenic medium can be retained low, which has a beneficial influence on the process and/or production rate. If the cereal grains are exposed to the cryogenic medium for a too long period of time, so that these are thoroughly cold, there is a smaller amount of large fibres and a larger amount of broken germs, which is undesired in view of the subsequent processing steps.

It is believed that moisture absorbed during the pretreatment step, e.g. by allowing the grains to steep in water for a sufficient period of time, enhances the strains and stresses, which are generated in the shell as the water freezes rapidly therein, and the cereal grains thus treated are subjected to a mechanical operation.

BRIEF DESCRIPTION OF THE DRAWINGS

In the accompanying drawing a block diagram of the processing of corn according to the invention into starch and gluten is schematically shown.

DESCRIPTION OF THE PREFERRED EMBODIMENTS

Figure 1:
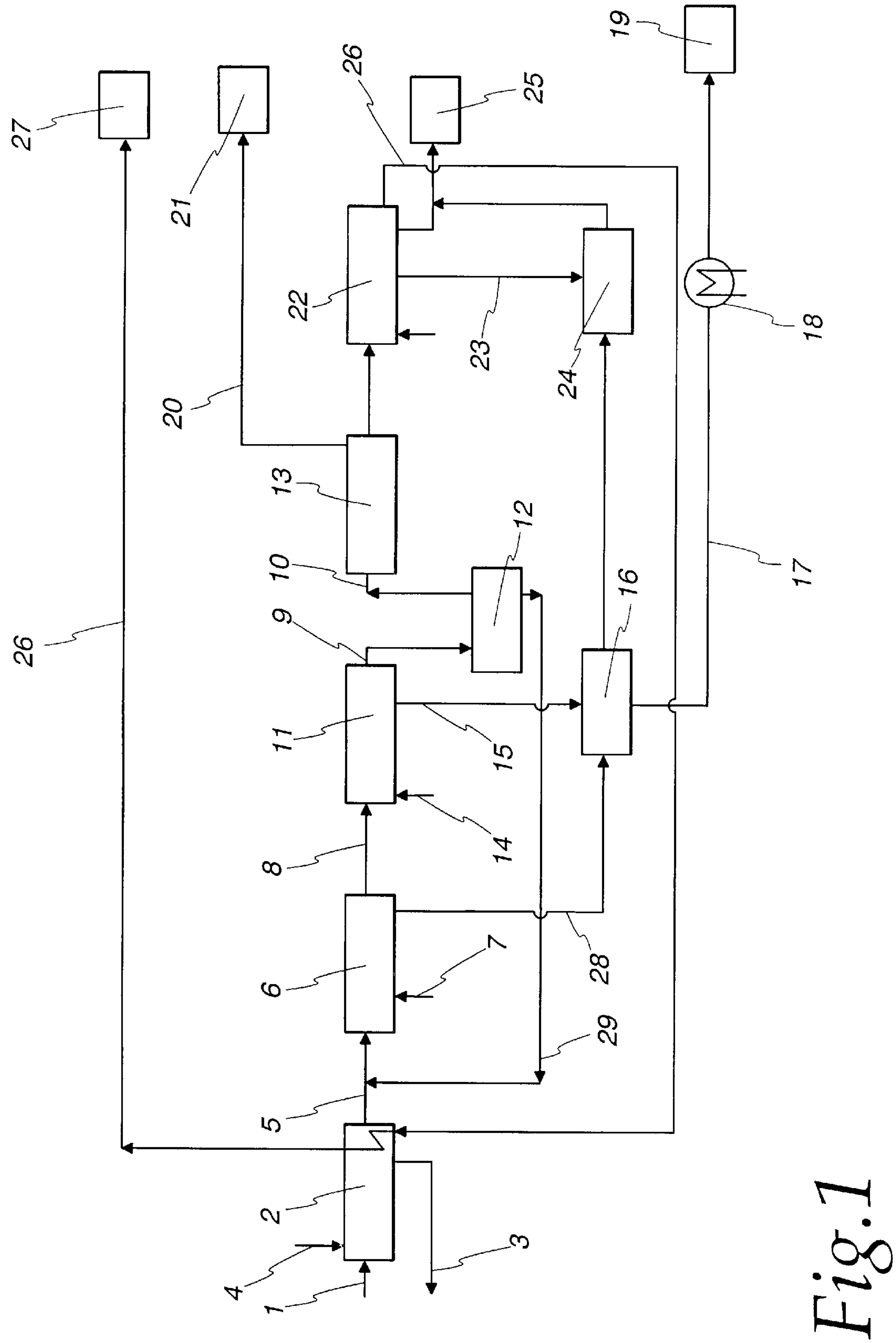

Preferably the pretreatment with moisture is carried out in such a manner that the moisture penetrates only into the capillaries, which are present in the shell (between aleurone and cross cells and tube cells) and around the germ (between a so called "cementing layer" and endosperm matrix). Experiments with corn have shown that a steeping time of about 15 minutes to about 1 hour is sufficient to fill the capillaries with water at room temperature. With respect thereto it is noted that the capillary between germ and endosperm is filled three times as fast as the capillary in the shell itself. Furthermore the length of the steeping time period depends on the water temperature. In corn the moisture content is raised to the range from 23–26% by weight, based on the weight of the moistened grains, whereas the initial content is about 16% by weight. The percentage at equilibrium in completely filled capillaries without having moisture being penetrated into the endosperm matrix is about 25% by weight, based on the weight of the moistened grains. Water which is attached to the periphery of the kernel and which would deteriorate the operation of the thermal shock, is removed advantageously, for example with the aid of air knives and the like, in advance of the thermal shock.

Therefore the inventive method differs from the conventional steeping step of wet methods according to the prior art, wherein the grains are wetted throughout.

In the present application the expression "shell, which contains fibres" is meant to be the outer fibrous layer or layers of the kernels, which layer or layers is/are also indicated by the term "bran".

According to the invention preferably sorted cereal grains, i.e. cereals from which the foreign matter and broken cereal grains have been removed, and afterwards the moisture content of which has been elevated sufficiently, are subjected to a thermal shock, so that because of the differences in thermal expansion coefficients and heat transfer coefficients between the fibrous shell and the remaining portion of the grain, comprising the germ and the endosperm matrix, the shell is splitted off, which is enhanced during the mechanical operation. Preferably the method is carried out by exposing the cereal grains to an environment of liquid nitrogen or carbon dioxyde, for example by immersion in such a cryogenic medium or by spraying of the cryogenic medium onto the cereal grains or in a reactor having a fluidized bed of cereal grains. Thereby the moisture sucked into the capillaries becomes supercooled and freezes while ice is formed, which generates the stresses and strains within the shell and around the germ. The liquid nitrogen and/or carbon dioxyde evaporate after establishing the thermal shock and these gases can be disposed off in an unhindered manner.

Furthermore it has been found unexpectedly that in exposing corn grains to a thermal shock, which grains have been pretreated according to the invention, not only the shell is removed, but also the germ is detached from the shell as well as from the endosperm matrix without damage.

Advantageously the cereal grains are subjected to a coarse milling operation immediately following the exposure to the thermal shock. In other words when the water in the capillaries is still frozen. Preferably this coarse milling operation is carried out in a milling device in such a manner by adjusting the rate and fineness that the germs will remain intact. This coarse milling operation contributes to the detachment of the shell and the germ.

The fibrous shells are crimped from the cereal grains by the combination of pretreatment, thermal shock and mechanical operation, thereby a dry mixture of the different constituents being obtained. This dry mixture can be easily separated in size and/or weight with the aid of suitable conventional techniques, such as screening, wherein a significant portion of the shells is retained as relatively large particles having a relatively low weight. A middle sized fraction contains smaller parts of the shell in addition to starch, gluten and germs. A small sized fraction contains even finer parts of the shells in addition to starch and gluten. Because of the difference in weight (density) the fibre components can be separated easily out from the middle and small sized fractions by means of a forced flow of air, such as fluidization in a fluid bed. The fibres, which are entrained by the fluidization medium, are separated therefrom efficiently using for example cyclones. The fibres thus separated are stored, if necessary after a pretreatment with heat, e.g. in a heat-exchanger.

The germs, which contain oil, can be removed easily from the remaining mixture by conventional techniques. Examples thereof are inter alia ultrasonic separation, separation on density (density difference), electronic scanning and extraction. The mixture remaining after this separation can be further separated into starch and gluten by conventional techniques.

As indicated hereinabove briefly, preferably the method according to the invention comprises a sorting step preceding the pretreatment step, wherein the cereal grains are separated into a fraction of whole cereal grains and a fraction, which comprises foreign matter and/or damaged cereal grains. This sorting step may be carried out in a conventional manner using windsieving (and if necessary electromagnets). A preferred sorting technique is based on optical recognition, e.g. using socalled vision systems, whereby an improved separation can be achieved. Optical recognition systems are commercially available, for example from Pulsarr, and these systems are already used for sorting peas and beans. This improved method of optical sorting cereal grains and foreign matter can also be applied advantageously in the existing processing of cereals, both dry and wet processing.

In order to acquire the information about the starting material which is needed for the pretreatment step and cryogenic crimping step, the fraction of whole cereal grains is analysed and examined, e.g. on moisture content, size, color, (number of) cracks and the like during or after the optical sorting operation.

The mixture of starch and gluten, which remains after removal of the fibres and the germs, can be subjected to a finer milling operation, wherein the size is reduced to a maximum of about 70 microns. Then this milled mixture is advantageously separated with the aid of static electricity. As starch and gluten possess different polarities—starch is neutral, while gluten is highly positive—this difference in polarity can be utilized for the intended separation. The movement of the gluten fraction to the respective electrode can be enhanced by incorporating the materials to be separated in a carrier gas. In order to avoid dust explosions preferably this step is carried out in an inert gas atmosphere, like nitrogen. Thereby dry starch and dry gluten are obtained as separated fractions.

The substeps discussed above can be beneficially used as such in the existing wet processes according to the prior art. These substeps as such are defined in claims 19 and 20. It will be appreciated by the skilled person that the maximum advantage regarding water and energy consumption will be obtained, when subsequent to the pretreatment step all substeps are carried out without the addition of water and/or chemicals as far as possible. Furthermore the use of a number of expensive and energy consuming devices, long steeping times as well as long storage periods are superfluous in the method steps according to the invention.

The dry starch thus obtained needs only to be mixed with the precise amount of water in the preparation of a starting slurry for the refining into syrups of glucose.

Corn is fed via a feeding conduit 1 into a pretreatment unit 2. The corn is sorted optically in the pretreatment unit 2—damaged grains and foreign matter being discharged via discharge conduit 3—, and after measurement of the initial moisture content the sorted corn is moistened with a predetermined amount of water, which is supplied via concuit 4. After the moisture content has been raised to about 25% by weight, based on the wet grains, the corn is passed to a thermal insulated chamber 6 via connecting conduit 5, in which chamber the corn is immersed in a bath of liquid nitrogen, which liquid nitrogen is supplied via a conduit 7 and directly afterwards the corn is subjected to a coarse milling operation. As a result of these treatment steps a dry mixture is produced, wherein all constituents of the corn grains initially charged are present. After the coarse milling operation, a coarse fraction of light parts of the fibrous shell is separated, which is passed to a fibre separation unit 16 via conduit 28. The remaining mixture is passed to separation units arranged in series via conduits 8, 9 and 10, which separation units comprise a fluidization apparatus 11 for separating the lighter parts of the shell, a classifying unit 12 and a vibrating table 13, which is inclinedly arranged, for removal of germs and separated in the respective constituents. Nitrogen gas is used in the fluidization device 11 as fluidization medium, which gas is supplied via conduit 14. The fraction of fibre-containing shells is discharged from the fluidization device 11 through discharge conduit 15 into an additional separation unit 16 and subsequently via conduit 17 and optional heat-exchanger 18 to fibre storage 19. The remaining particles of starch and gluten and the germs pass into degerming device 13 via classifying unit 12, in the latter occurring a further separation in size and/or weight. In the degerming device 13 the germs are seperated by vibration and discharged to storage 21 via conduit 20. The remaining mixture is separated into a gluten fraction and starch fraction using an electrostatic separator 22, which is operated under a nitrogen atmosphere. Optionally a finer milling operation (not shown) is applied preceding the electrostatic separation. The gluten fraction is discharged to storage 25 via conduit 23 and an additional separator 24. The starch fraction is removed via conduit 26 and discharged to storage 27, optionally after being predried and subjected to a heat exchange in the pretreatment device 2 with fresh supplied corn. Insufficiently milled material is returned to the inlet of the chamber 6 via return conduit 29. The electrostatic separator is maintained under an atmoshere of nitrogen gas in order to minimalize the risk of a dust explosion.

EXAMPLES

The invention is further illustrated by the following non-limiting examples.

A quantity of corn grains (1000 g) was steeped for 1 hour in a large volume of water (1,5 l), whereby the moisture content initially being 16.0% by weight was raised to 25.05% by weight. The corn thus preconditioned was completely immersed in a bath of liquid nitrogen (at about −190° C.) for 1 sec., thereby cooling the shell strongly and rapidly, while the interior was cooled to a much lesser extent. Immediately following this thermal shock the corn was milled in a mill of the centrifuge type, available at MicroTec. This mill having a housing with a conical shape, which functions as a stator, can be provided with 3 blades, an upper blade, which is called an impact blade, and two adjacent blades, disposed below the impact blade. The distance between the blades and the housing was adjusted at 5 mm, so that in any case the germs would not be damaged. In example 1 the impact blade was not used. The finest product did fill the stator which was provided with protrusions, with the result that in fact the quantity of the fraction having dimensions of <1.4 mm was higher. In Example 2 the mill had all 3 blades, while in Example 3 only the impact blade and that blade which is situated directly below the impact blade were used. The number of revolutions was set at the same value in all Examples.

TABLE 1

| | Example 1 | | Example 2 | | Example 3 | |
|---|---|---|---|---|---|---|
| DIMENSION X (MM) | WEIGHT (g) | WT. % | WEIGHT (g) | WT. % | WEIGHT (g) | WT. % |
| X < 1.4 | 111.9 | 10.9 | 187.3 | 19.3 | 183.7 | 18.3 |
| 1.4 < X < 2.4 | 127.3 | 14.7 | 155.9 | 14.2 | 133.4 | 10.4 |
| 2.4 < X < 4.0 | 262.0 | 48.1 | 362.3 | 47.7 | 297.6 | 36.3 |
| 4.0 < X < 6.3 | 146.7 | 19.5 | 166.2 | 15.9 | 218.6 | 23.8 |
| X > 6.3 | 95.3 | 6.8 | 85.5 | 2.8 | 138.5 | 11.2 |

The fibres are contained mainly in the fraction X>6.3 mm, together with some starch and gluten. The finer fibres and the remaining gluten and starch are divided over all other fractions. The germs are contained in the fractions of 1.4 mm through 4.0 mm.

When the obtained fractions of Example 3 are separated according to the invention into the respective components, the following results are achieved.

TABLE 2

| | EXAMPLE 3 | |
|---|---|---|
| | WEIGHT (g) | WT. % |
| FIBRES | 48.99 | 10.4 |
| GERMS | 37.48 | 8.0 |
| COARSE MILLING | 210.77 | 44.8 |
| FINE MILLING | 172.85 | 36.8 |
| STARCH & GLUTEN | 383.62 | 81.6 (9)* |

*the value presented in ( ) is the percentage by weight of gluten

Representative results of a conventional separating method according to the prior art are 21% of fibres, 6% of germs, 5% of gluten and 67% of starch. It is apparent that in the method according to the invention it is possible to work substantially without water, but that also the efficiency of the separation is improved, thereby achieving a higher yield of starch and gluten.

Although the above example is directed to a method according to the invention starting from corn grains it is believed that other cereals, which have a similar shell structure having a capillary therein, as well as a capillary surrounding the germ, can be processed into fractions of starch and gluten respectively in a similar manner, wherein the time of the moistening treatment will vary from kind to kind which time is necessary to allow the capillaries being filled completely.

What is claimed is:

1. A method of removing fibrous shells from cereal grains, wherein the cereal grains are corn grains, the method comprising:

a moistening step;

a step of exposure of the cereal grains to a thermal shock by a cryogenic medium after the moistening step; and a step of mechanical treatment thereof after the thermal shock, wherein the cereal grains in the moistening step are subjected to moistening by steeping the cereal grains in water for a time effective to increase the moisture of the cereal grains to a range of 23–26% by weight based on the weight of the moistened cereal grains.

2. A method according to claim 1, wherein the method further comprises separating a germ free fraction into a starch fraction and a gluten fraction using static electricity.

3. A method according to claim 1, wherein the moistening step comprises the filling of empty capillaries, which empty capillaries are present in the shell, as well as between the germ and the endosperm matrix.

4. A method according to claims 3 or 1, wherein the corn grains are allowed to steep in water for a period of time from 15–60 minutes.

5. A method of separating decorticated cereal grains, which are reduced in size and which do not contain germs, into a starch fraction and a gluten fraction, wherein the starch fraction and gluten fraction are separated from one another by static electricity.

6. A method according to claim 5, wherein the separation is conducted in an inert gas atmosphere.

7. A method of processing cereal grains, which cereal grains have at least a fibrous shell, endosperm, a germ and capillaries in the shell and around the germ, the method comprising:

a) subjecting the cereal grains to moisture to put water into the capillaries in an amount effective for making the fibrous shell split from the remaining portion of the grain after a thermal shock, but without moisture penetration of the endosperm;

b) exposing the cereal grains with water in the capillaries to thermal shock with a cryogenic medium;

c) subjecting the cereal grains which were thermally shocked to a mechanical treatment to remove the fibrous shells; and d) separating the mechanically treated cereal grains into a fraction of decorticated cereal grains and a fraction of fibrous shells.

8. The method according to claim 7, the method further comprising processing the decorticated cereal grain fraction into a starch fraction and a gluten fraction.

9. The method according to claims 7 or 8 wherein the moistening is for about 15 to about 60 minutes.

10. A method of processing cereal grains into starch and gluten, which cereal grains have at least a fibrous shell, a germ and capillaries in the shell and around the germ, wherein the method comprises:

a) a pretreatment step of subjecting the cereal grains to a moistening treatment, wherein the cereal grains are subjected to moisture to put water into the capillaries in an amount effective for making the fibrous shell split from the remaining portion of the grain after a thermal shock, but without moisture penetration of the endosperm and a step of subjecting the cereal grains thus exposed to the thermal shock to a mechanical treatment thereby removing the fibrous shells;

b) a separation step of separating the cereal grains thus treated into a fraction of decorticated cereal grains and a fraction of the fibrous shells; and c) further processing of the fraction of decorticated cereal grains into a starch fraction and a gluten fraction.

11. A method according to claim 10, wherein during the pretreatment step the moisture content of the cereal grains being corn is adjusted within the range of 23–26% by weight, based on the weight of the moistened cereal grains.

12. A method according to claim 10, wherein the moistening treatment comprises steeping the cereal grains in water for a period of time from 15–60 minutes.

13. A method according to claim 10, wherein the mechanical treatment comprises the step of coarsely milling the cereal grains in such a manner that the germs remain intact.

14. A method according to claim 13, wherein said further processing comprises a second separation step of separating the decorticated cereal grains into a fraction of germs and a germ free fraction, and a third separation step, wherein the germ free fraction is separated into the starch fraction and the gluten fraction.

15. A method according to claim 14, wherein the second separation step is carried out on an inclined and vibrating conveyor.

16. A method according to claim 14, wherein the third separation step is carried out using static electricity.

17. A method according to claim 10, wherein the method comprises a sorting step of sorting the cereal grains, preceding the pretreatment step, wherein the cereal grains are separated into a fraction of the whole cereal grains and a fraction, which comprises foreign matter and/or damaged cereal grains.

18. A method according to claim 17, wherein the sorting step is carried out using optical recognition techniques.

19. A method according to claim 17, wherein the initial moisture content of the fraction containing the whole cereal grains is determined.

* * * * *